(12) United States Patent
Baasch et al.

(10) Patent No.: US 7,479,088 B2
(45) Date of Patent: Jan. 20, 2009

(54) TRANSMISSION DEVICE AND METHOD FOR CONTROLLING AND REGULATING A TRANSMISSION DEVICE

(75) Inventors: Detlef Baasch, Friedrichshafen (DE); Gerhard Gumpoltsberger, Friedrichshafen (DE); Christoph Pelchen, Tettnang (DE); Barbara Schmohl, Friedrichshafen (DE); Ulrich Mair, Friedrichshafen (DE); Thomas Rosemeier, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 341 days.

(21) Appl. No.: 10/574,725

(22) PCT Filed: Oct. 2, 2004

(86) PCT No.: PCT/EP2004/011028

§ 371 (c)(1),
(2), (4) Date: Apr. 6, 2006

(87) PCT Pub. No.: WO2005/050065

PCT Pub. Date: Jun. 2, 2005

(65) Prior Publication Data

US 2006/0225982 A1 Oct. 12, 2006

(30) Foreign Application Priority Data

Oct. 22, 2003 (DE) .................... 103 48 959

(51) Int. Cl.
*F16H 3/44* (2006.01)
(52) U.S. Cl. ...................... 475/288; 475/295

(58) Field of Classification Search ............. 475/221, 475/222, 248, 249, 204, 205, 271, 295, 275–292, 475/296, 337; 74/665 F, 665 G, 665 GA, 74/665 S, 665 T, 665 K; 180/248, 249
See application file for complete search history.

(56) References Cited

U.S. PATENT DOCUMENTS 4,309,914 A * 1/1982 Hiersig et al. ............... 74/15.4

(Continued)

FOREIGN PATENT DOCUMENTS

DE 40 00 667 A1 7/1990

(Continued)

OTHER PUBLICATIONS

Besson, Bernard, "Double Épicycle À Glissement Contrôlé Application à la Traction des véhicules "Doble Epicycle" to Control Slip: Implementation on Drive-Trains", Ingenieurs de l'Automobile, RAIP, Boulogne, France, No. 649, Jun. 1, 1989, pp. 104-107.

*Primary Examiner*—Roger Pang
(74) *Attorney, Agent, or Firm*—Davis & Bujold, P.L.L.C.

(57) ABSTRACT

A transmission for distributing a drive torque between at least two drive output shafts with at least two planetary gearsets, each having at least three-shafts. In each case, a shaft of a planetary gearset is connected to a drive input shaft and a second respective shaft of a planetary gearsets is the drive output shafts. A respective third shaft of the planetary gearsets communicates with a brake such that a degree of distribution of the drive torque between the two output shafts varies as a function of the transfer capacities of the brakes. A transmission device controls and regulates a drive torque from a drive engine between the two output shafts of the transmission device. The transfer capacities of the two brakes are adjusted such that one brake is in a synchronous condition and the transfer capacity of the other brake is varied between a lower and an upper limiting value.

21 Claims, 7 Drawing Sheets

U.S. PATENT DOCUMENTS

| | | | |
|---|---|---|---|
| 4,327,603 A | * 5/1982 | Zaunberger et al. | 475/22 |
| 4,471,669 A | 9/1984 | Seaberg | |
| 5,056,614 A | * 10/1991 | Tokushima et al. | 180/248 |
| 5,135,071 A | 8/1992 | Shibahata et al. | |
| 5,370,588 A | * 12/1994 | Sawase et al. | 475/84 |
| 5,435,790 A | 7/1995 | Kota et al. | |
| 6,206,798 B1 | 3/2001 | Johnson | |
| 6,830,530 B2 | 12/2004 | Perkins et al. | |

FOREIGN PATENT DOCUMENTS

| | | |
|---|---|---|
| DE | 103 44 556 A1 | 6/2004 |
| WO | WO-99/17948 | 4/1999 |
| WO | WO-02/09966 A1 | 2/2002 |

* cited by examiner

US 7,479,088 B2

TRANSMISSION DEVICE AND METHOD FOR CONTROLLING AND REGULATING A TRANSMISSION DEVICE

This application is a national stage completion of PCT/EP2004/011028 filed Oct. 2, 2004 which claims priority from German Application Serial No. 103 48 959.2 filed Oct. 22, 2003.

FIELD OF THE INVENTION

The invention concerns a transmission device, a method for controlling and regulating a transmission device and a drive train of a vehicle.

BACKGROUND OF THE INVENTION

In vehicles known from the prior art, transmission devices are arranged between a power aggregate and a drive output, in order to enable various operating conditions such as driving forward, driving in reverse and thrust and traction operation. During this, the drive torque of the engine is applied to the front axle in front-wheel-drive vehicles, to the rear axle in rear-wheel-drive vehicles, and in the case of all-wheel-drive vehicles to two or more of the axles of the all-wheel-drive vehicle with various set degrees of distribution.

In such vehicles, a main transmission is arranged between the drive engine and the driven vehicle axles by way of which various gear ratios can be engaged. This takes into account the manner in which a drive engine made as an internal combustion engine delivers its torque or power as a function of speed. Such main transmissions are made as manual shift transmissions, sequential automatic transmissions or even continuously variable automatic transmissions.

To be able to distribute the torque delivered by the power aggregate to several driven vehicle axles in the longitudinal direction of a vehicle, in the power flow of a drive train transmission devices or longitudinal distributor transmissions are connected downstream from the main transmission described above. These being designed as separate structural units, being integrated in the main transmission or being made as so-termed hang-on systems on the main transmission.

Furthermore, provision is also made for distributing the drive torque delivered to a driven vehicle axle between the two drive wheels of that vehicle axle so that the drive wheels of a driven vehicle axle can be driven at different speeds independently of one another in accordance with the different path lengths of the left and right steering tracks, whereby the drive torque can be distributed to the two drive wheels symmetrically and thus free of any yaw torque component.

The structural type of differentials conventionally used in practice are so-termed bevel gear differentials, spur gear differentials of planetary design or even worm gear differentials. Spur gear differentials, in particular, are mostly used as longitudinal differentials because of the possibility of unsymmetrical torque distribution. At present, bevel gear differentials are standard for transverse equalization in vehicles and worm gear differentials are used both for longitudinal and for transverse distribution.

However, these two advantages are offset by the drawback that because of the equalizing action of a differential, the propulsive forces that can be transferred to the road by two drive wheels of a vehicle axle or from two or more driving axles is determined in each case by the lower or lowest transferable drive torque of the two drive wheels or driving axles. This means that when, for example, a drive wheel resting on smooth ice skids, no torque higher than that of the skidding drive wheel can be supplied to the other drive wheel, even when the latter is on ground that it could grip. In such a driving situation, the vehicle might disadvantageously not be able to start off because of the equalizing action of a differential, which allows a difference of speed between two drive output shafts of the differential.

Accordingly in practice, it has become customary to prevent equalization movement of a differential by suitable means in the event of critical driving situations. This is done, for example, by a differential lock, known as such, which can be actuated manually or automatically by mechanical, magnetic, pneumatic or hydraulic means and which fully prevents any equalization movement by blocking the differential.

WO 02/09966 A1 discloses a transmission for a four-wheel-drive vehicle, in which an input shaft is connected to a planetary gearset. Here, the planetary gearset is made as a three-shaft planetary gearset, such that an annular gear wheel is in active connection with the input shaft, a solar gear wheel with a first drive output shaft and the planetary carrier with a planetary gear system and with another drive output shaft of the transmission. The planetary gear system comprises three solar gear wheels and three planetary gears each of which meshes with one of the solar gear wheels, which are made integrally with one another and have a common planetary carrier. The planetary carrier of the planetary gear system and one of its solar gear wheels are each in active connection with a brake. These brakes are connected to a force supply and are operated independently of one another and controlled by an electronic control device. A plurality of sensors are connected to the electronic control device, whose signals are received by the electronic control device and converted into corresponding control signals for the two clutches. Depending on the control of the two clutches, the initial speed and the torque transmitted to the front axle, and the drive output speed of the planetary gear system and the torque transmitted to the rear axle, are adjusted.

However, these all-wheel distributor systems known from the prior art have the drawbacks that variable distribution of the torque can only be carried out to a limited extent and that they are of elaborate design. Owing to their elaborate structure, such all-wheel distributor systems have large overall dimensions and, therefore, take up considerable space. Furthermore, the known all-wheel distributor systems are disadvantageously characterized by large inherent weight and high manufacturing costs.

Accordingly, the purpose of the present invention is to make a transmission device for a drive train of a vehicle available, which is of simple construction and can be manufactured inexpensively, and a method for controlling a transmission device with which the degree of distribution of a drive torque between two drive output shafts can be varied according to need.

SUMMARY OF THE INVENTION

With the transmission device of the invention for distributing a drive torque to at least two drive output shafts with at least two planetary gearsets each having at least three-shafts, in which a respective first shaft of a planetary gearset is connected to a drive input shaft and a respective second shaft of a planetary gearset constitutes one of the drive output shafts, a drive torque can be distributed variably between several driven axles of a vehicle or between two drive wheels of a driven vehicle axle according to need and in a manner that depends on the operating situation. Furthermore, the transmission device is of simple structure and can be produced inexpensively.

This is achieved by having a respective third shaft of the planetary gearsets in active connection with a brake, so that the degree of distribution of the drive torque between the two drive output shafts can be varied as a function of the transfer capacities of the brakes.

The method for controlling and regulating the transmission device, according to the invention described above, reduces power losses compared with the all-wheel systems known from prior practice, in which a drive torque can be distributed variably between several drive vehicle axles or between two drive wheels of a driven vehicle axle by virtue of frictional shift elements. For this purpose, to distribute a drive torque of the driving engine between the two output shafts of the transmission device, which can optionally be connected respectively to a driven vehicle axle of a motor vehicle or to a respective drive wheel of a driven vehicle axle, the transfer capacities of the two brakes are adjusted in such a manner that one of the brakes is engaged and the transfer capacity of the other brake is varied between a lower limiting value and an upper limiting value, the latter corresponding to engagement of the brake.

According to the invention, with the procedure a drive torque or rotary torque can be continuously varied between the two drive output shafts of the transmission device of the invention. One of the two brakes in each case are kept in an engaged condition involving no loss while the other brake is operated in the open condition, in a slipping condition or in the engaged condition in order to distribute the drive torque between the two output shafts.

In the vehicle drive train, according to the invention, the use of the transmission device in a longitudinal drive train between two driven vehicle axles and/or in a transverse drive train of a driven vehicle axle to distribute a drive torque in the longitudinal direction of the vehicle and/or in the transverse direction of the vehicle, makes it possible to distribute a drive torque, as necessary, and in relation to the operating situation, between several driven vehicle axles and/or between two drive wheels of a driven vehicle axle.

BRIEF DESCRIPTION OF THE DRAWINGS

The invention will now be described, by way of example, with reference to the accompanying drawings in which.

DETAILED DESCRIPTION OF THE INVENTION

Figure 1:
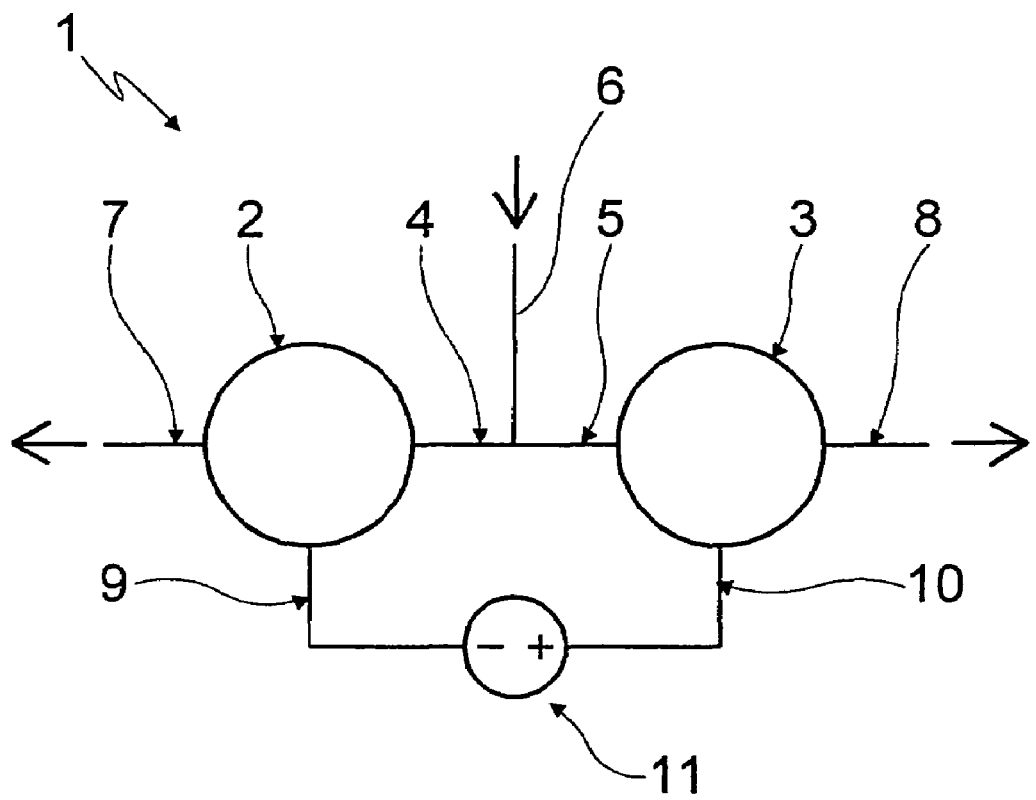
FIG. 1 is a basic layout of a transmission device according to the invention.

Referring to FIG. 1, a basic layout of a transmission or transmission device 1 is shown, which can be used as a differential in the power path of a drive train of a vehicle between a main gearbox and the driven axles of the vehicle for the longitudinal distribution of a drive torque from a drive engine between at least two driven vehicle axles or in a power path of at least one of the driven vehicle axles for the transverse distribution of part of a drive torque delivered to a driven vehicle axle between two drive wheels of the vehicle axle.

The transmission 1 is configured with a first planetary gearset 2 and a second planetary gearset 3 which, depending on the respective application concerned, can be made as minus, plus, bevel gear or sequential planetary gearsets. In each case, a first shaft 4, 5 of the two planetary gearsets 2, 3 is connected to a drive input shaft 6, which constitutes a transmission output shaft of a main gearbox (not shown) of the drive train. In each case, second shafts 7 or 8 of the two planetary gearsets 2, 3, respectively, constitute drive output shafts of the transmission 1, which are in active connection either with the driven vehicle axles or with the drive wheels of one vehicle axle. A third shaft 9 of the first planetary gearset 2 and a third shaft 10 of the second planetary gearset 3 are connected to one another via an active connection 11.

The active connection 11 is designed such that an operating-status-dependent torque of the third shaft 9 of the first planetary gearset 2 or of the third shaft 10 of the second planetary gearset 3, depending on an operating status of the third shaft 10 of the planetary gearset 3 or of the third shaft 9 of the first planetary gearset 2, can be supported in such a manner that, if a difference in speed occurs between the output shafts 6, 7, by virtue of the active connection 11, a torque that influences the speed difference is applied to the planetary gearsets 2 and 3 or to the respective third shafts 9 and 10 thereof.

For this purpose the active connection 11 can be configured in the manner described in greater detail below alternatively or in combination with a speed inversion between the two shafts 9 and 10 in active connection with one another, a continuously variable transmission ratio device, with a torque source to increase or reduce a torque on at least one of the two shafts 9 and 10 in active connection with one another, and/or a third planetary gearset.

Figure 2:
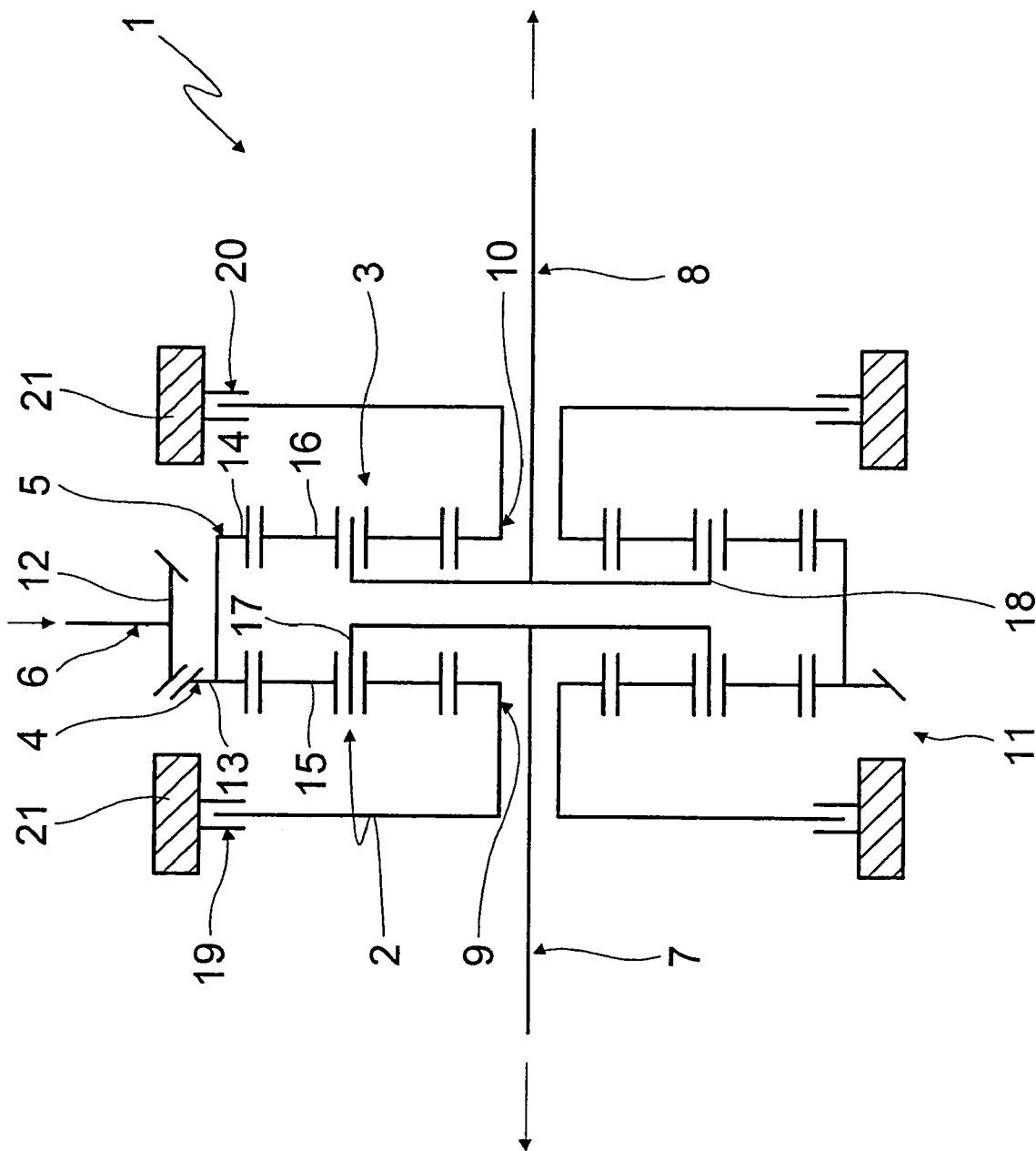
FIG. 2 is a gear layout of a transmission device according to the invention configured as an axle differential, such that the active connection between the two planetary gearsets comprises two brakes.

FIG. 2 shows a gear layout of a first example embodiment of the transmission 1, according to the invention, whose basic layout is represented in FIG. 1. A drive torque of the drive input shaft 6 is transferred by a first bevel gear 12 to two annular gear wheels 13, 14 of the two planetary gearsets 2 and 3 connected one after another, which constitute the two first shafts 4 and 5 of the two planetary gearsets 2 and 3 represented only schematically in FIG. 1. From there on, the drive torque of the input shaft 6 is transferred to the planetary gear wheels 15 and 16 engaged with the two annular gear wheels 13 and 14, each mounted to rotate on a web 17 or 18 and which drive the two webs 17 and 18 by virtue of their rolling movement in the annular gear wheels 13 and 14. In turn, the two webs 17 and 18 of the planetary gearsets 2 and 3 are connected to the two drive output shafts 7 and 8, so that the drive torque transmitted via the first bevel gear 12, the two annular gear wheels 13 and 14, the planetary gear wheels 15 and 16 and the webs 17 and 18, reaches the two output shafts 7 and 8.

In addition, the planetary gearwheels 15 and 16 of the planetary gearsets 2 and 3 mesh respectively with the solar gear wheels or the third shafts 9 and 10 of the planetary gearsets 2 and 3, which are each in active connection with a respective brake 19 and 20 by way of which, when the transfer capacity is adjusted appropriately, in each case a torque can be supported by a housing 21 of the transmission device 1.

This means that the active connection 11, represented in FIG. 1, is realized in the example embodiment of the transmission device 1, represented in FIG. 2, by the two brakes 19 and 20 and the transmission housing 21, such that the two brakes 19 and 20 can be controlled by a separate control unit or by the transmission control element of the transmission device 1.

In the present case the two brakes 19 and 20 each constitute ways for applying a torque or a source of torque to increase or reduce a torque on at least one of the two shafts 9 and 10 in active connection with one another, in such a manner that depending on the torque applied by the brakes on the active connection 11, the drive torque introduced from the drive input shaft 6 into the transmission device 1 is divided variably between the two output shafts 7 and 8.

The design of the active connection 11 with the two brakes 19 and 20 as a torque source offers the possibility, depending on the operating status, of applying a respective braking torque to the two solar gears 9 and 10 of the two planetary gearsets 2 and 3 in active connection with one another in such a manner that, for example, when there is a speed difference between the two output shafts 7 and 8, an equalization action of the transmission 1 between the two output shafts 7 and 8 is reduced. In other words, by way of the two brakes 19 and 20 a controlled torque reduction on the two solar gears or third shafts 9 and 10 of the two planetary gearsets 2 and 3 in active connection with one another can be effected, for example, to counteract any oversteering or understeering while driving round a bend by reducing the speed difference between the drive wheels of a driving axle effectively and in a simple way.

In addition, the sensitivity of a vehicle to side winds can be improved by controlled adjustment of a speed difference between the two drive output shafts and so therefore between two drive wheels of a vehicle axle.

Figure 3:
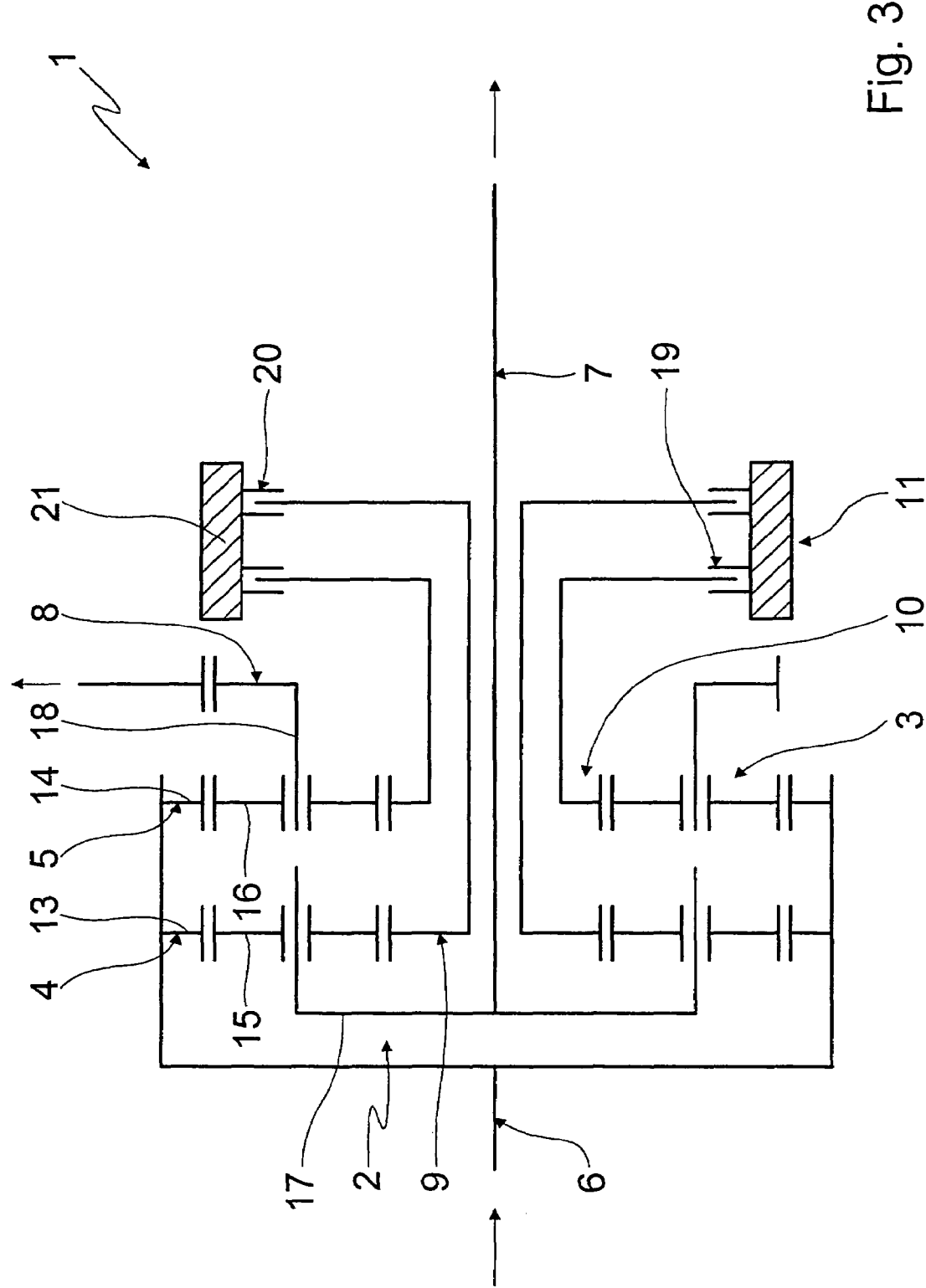
FIG. 3 is a gear layout of a transmission device according to the invention configured as a longitudinal distributor differential, whose active connection between the two planetary gearsets comprises two brakes.

FIG. 3 shows another example embodiment of a gear layout of the transmission 1 according to the invention. The gear layout of the transmission 1, shown in FIG. 3, constitutes a longitudinal distributor differential in which the active connection 11 between the third shaft 9 of the first planetary gearset 2 and the third shaft 10 of the second planetary gearset 3 is again realized by way of the two brakes 19 and 20 that can be supported on the housing.

Figure 4:
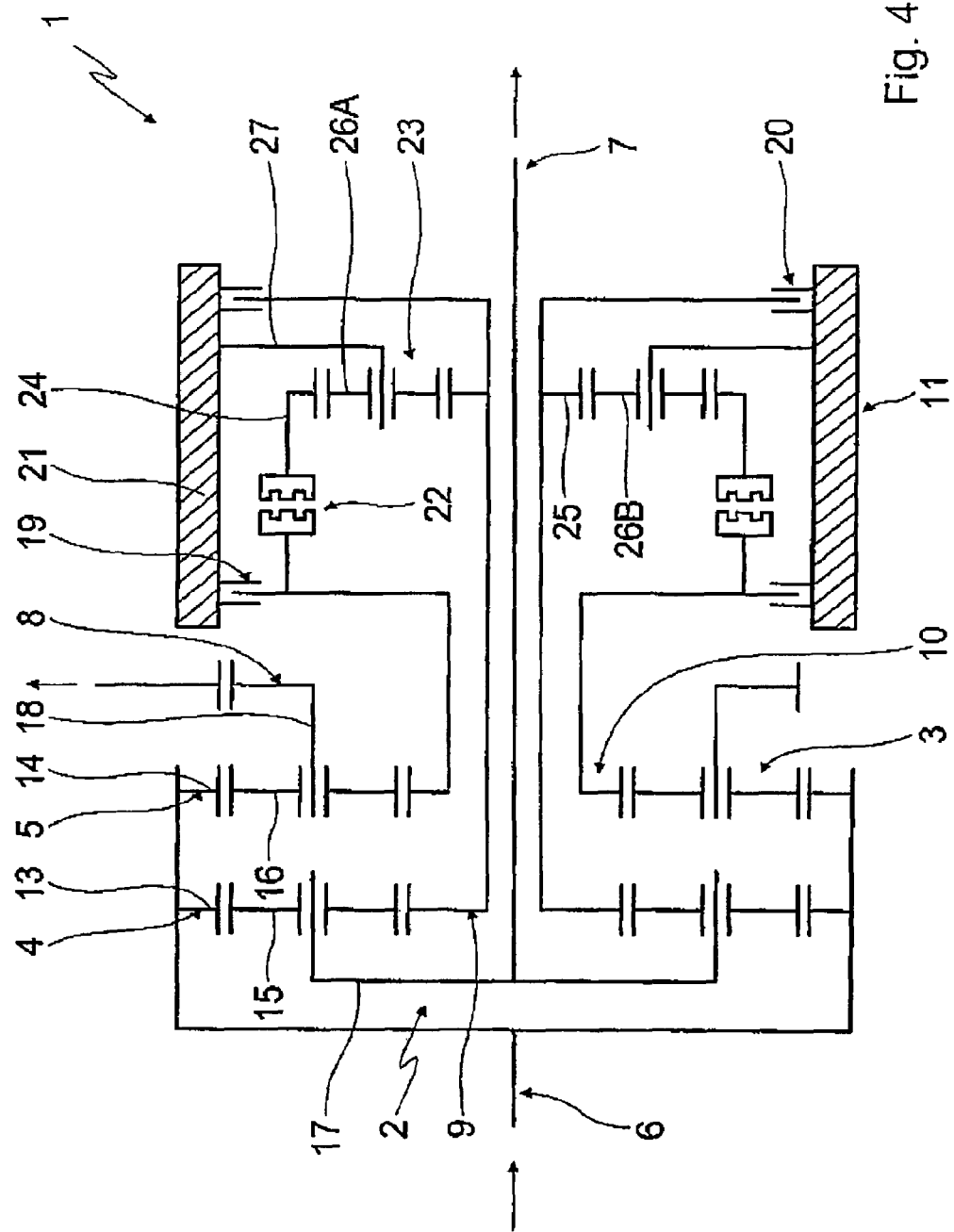
FIG. 4 is a gear layout of a transmission device as in FIG. 3, such that the active connection is configured with an additional, third planetary gearset which can be engaged.

Referring to FIG. 4, a gear layout of a further embodiment of the transmission device 1, according to the invention, is shown in which the active connection 11 consists of two power paths parallel to one another. A first power path is formed by a third planetary gearset 23 which, in the present case, can be engaged in the force flow of the transmission 1 by way of a claw-type clutch 22. The second power path consists of the two brakes 19, 20, respectively, connected with the solar gear 9 of the first planetary gearset 2 and the solar gear 10 of the second planetary gearset 3 which, in the engaged condition, fix the two solar gears 9 and 10 of the planetary gearsets 2 and 3 relative to the transmission housing and the transmission housing 21. If the two brakes 19 and 20 are both engaged at the same time, all differential action of the transmission 1 is completely prevented and the two output shafts 7 and 8 run at the same speed.

Figure 5:
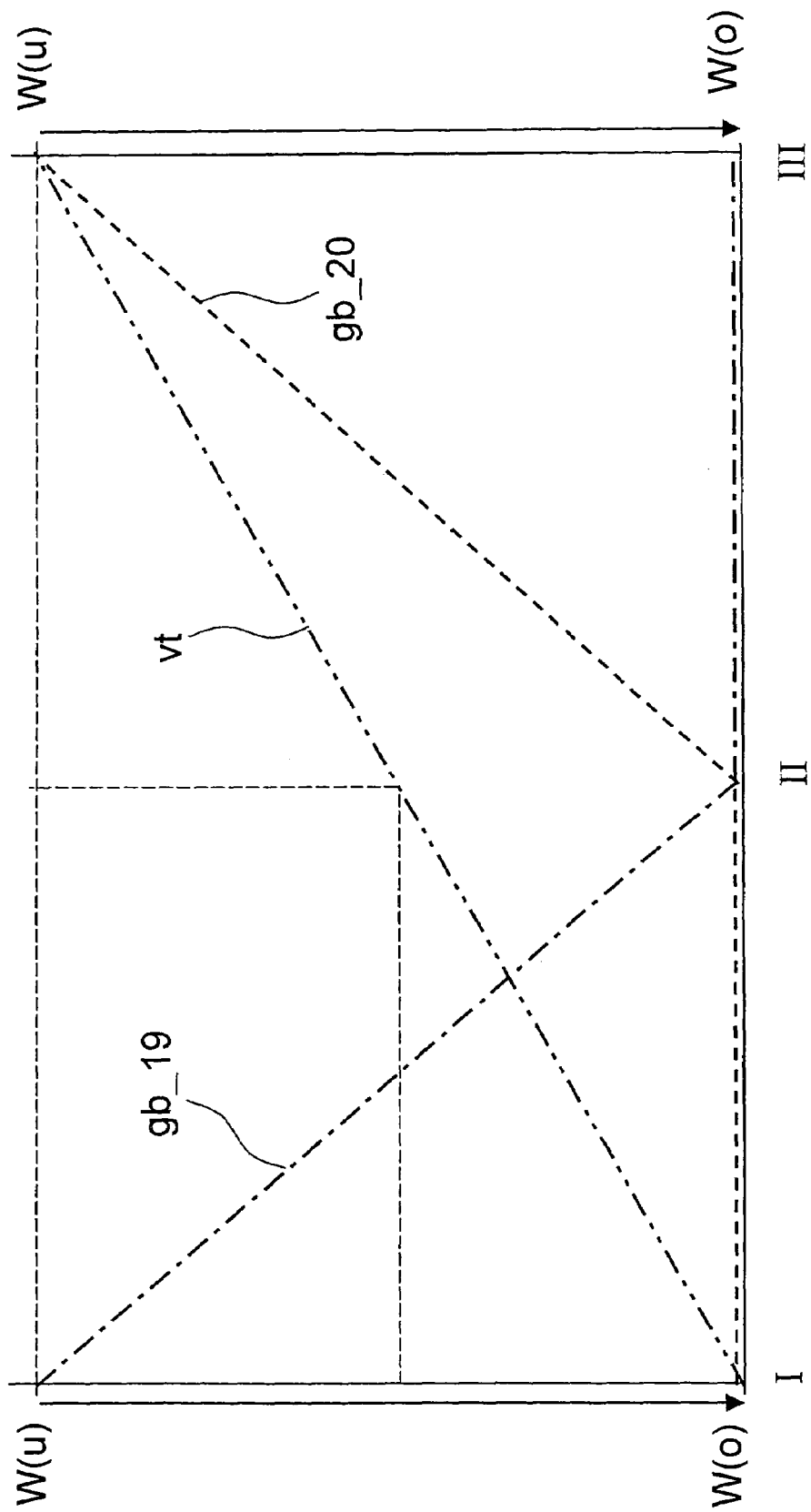
FIG. 5 is a graphical representation of a relationship between the transfer capacities of the brakes shown in FIGS. 2 to 4 and the degree of distribution of a drive torque between two output shafts of the transmission device according to the invention.

When the claw clutch 22 is open, the control method of the two brakes 19 and 20, illustrated in FIG. 5, enables the degree of distribution of the drive torque between the two output shafts 7 and 8 to be varied between 0% and 100% and, to reduce power loss, one respective brake 19 or 20 is preferably operated in the engaged condition and the respective other brake 20 or 19 is operated between a completely released and a completely engaged condition.

The third shaft or solar gear 10 of the second planetary gearset 3 is connected to an annular gear wheel 24 of the third planetary gearset 23 and the third shaft or solar gear 9 of the first planetary gearset 2 is coupled with a third shaft or solar gear 25 of the third planetary gearset 23. Between the annular gear wheel or first shaft 24 of the third planetary gearset 23 and the solar gear 25 of the third planetary gearset 23 are rolling a plurality of planetary gears, two of which 26A and 26B are shown in FIG. 4, these being mounted on a planetary carrier or second shaft 27 of the third planetary gearset 23 arranged fixed to the housing.

When the brakes 19 and 20 are both open and, at the same time, the claw clutch 22 is engaged, then depending on a basic distribution of the transmission 1 the drive torque transferred by the drive input shaft 6 into the transmission device 1 is distributed to the two output shafts 7 and 8. The degree of the basic distribution is determined by the ratio of the number of teeth on the annular gear wheel 24 to the number of teeth on the solar gear 25 of the third planetary gearset 23. As a function of a braking torque applied from the brake side by the brake 19 or the brake 20 multiplied by a factor of a ratio between the teeth number on the annular gear wheel 4 of the first planetary gearset 2 or on the annular gear wheel 5 of the second planetary gearset 3 and the teeth number on the solar gear 9 of the first planetary gearset 4 or the solar gear 10 of the second planetary gearset 5, the basic degree of distribution can be continuously varied in the direction of an upper or a lower limiting value of the degree of distribution.

FIG. 5 shows three very schematic variations, of which a first variation gb_19 is the variation of the transfer capacity of the first brake 19 between a lower limiting value W(u) and an upper limiting value W(o). Another variation gb_20 is that of the transfer capacity of the second brake 20, which corresponds with the variation gb_19 of the first brake 19. A third variation vt is a graphical representation of the variation of a degree of distribution of the drive torque between the two drive output shafts 7 and 8 as a function of the variations gb_19 and gb_20 of the transfer capacities of the brakes 19 and 20.

At Point I where the transfer capacity of the first brake 19 corresponds to the lower limiting value W(u), in essence no torque is supported in the housing 21 of the transmission 1 by virtue of the first brake. At the same time, the transfer capacity of the second brake 20 is set at the upper limiting value W(o), at which the second brake is engaged. In this operating condition of the two brakes 29 and 20, the entire drive torque of an engine or the transmission output torque of a main gearbox is transferred to the output shaft 7 connected with the first planetary gearset 2.

In the range between the Point I and a Point II in the diagram of FIG. 5, the transfer capacity of the second brake 20 undergoes controlled and regulated adjustment in such a manner that the second brake 20 is engaged. At the same time, the transfer capacity of the first brake 19 is changed from its lower limiting value W(u) at which it transfers no torque to the housing 21 of the transmission, towards the direction of the upper limiting value W(o) of the transfer capacity. This means that the transfer capacity of the first brake 19 is steadily increased in the range between Point I and Point II. In consequence, the degree of distribution of the drive torque between the two output shafts 7 and 8 changes, since as the transfer capacity of the first brake 19 increases, an increasing fraction of the drive torque is transferred to the output shaft 8 connected to the second planetary gearset 3.

In an operating condition of the transmission 1 which corresponds to Point II of the diagram in FIG. 5, when both brakes 19 and 20 are engaged, there is a defined degree of distribution of the drive torque between the two output shafts 7 and 8.

In a range between the Point II and Point III in the FIG. 5 diagram, the transfer capacity of the first brake 19 undergoes regulated and controlled adjustment in such a manner that the first brake 19 is engaged. At the same time, the transfer capacity of the second brake 20, starting from the upper transfer capacity limiting value W(o) at which the second brake 20 is engaged, is reduced steadily towards the lower limiting value W(u) of the transfer capacity at which the second brake 20 supports essentially no torque in the housing 21 of the transmission 1.

As can be seen in FIG. 5, the variation vt of the degree of distribution of the drive torque between the two output shafts 7 and 8 increases with progressive reduction of the transfer capacity of the second brake 20 up to its maximum value at Point III, where the drive torque is transferred completely to the output shaft 8 connected to the second planetary gearset.

By way of the two controlled and regulated brakes 19 and 20 the possibility is provided of distributing the drive torque, according to need, in a continuous and efficiency-optimized manner between the two output shafts 7 and 8. The control and regulation procedure for the two brakes, according to the invention described above, improves efficiency because one of the two brakes 19 or 20 is always operated in the engaged condition and free from slip, while the other brake 20 or 19, respectively, is operated with a speed difference that corresponds to a drive power distribution in the drivetrain which depends on the operating situation. By virtue of this operating strategy, frictional losses can be minimized with all the advantages of an all-wheel drive controlled by a frictional shift element.

In addition, there is the possibility of synchronizing the claw clutch 22 by way of the two brakes 19, 20 and incorporating the third planetary gearset 23 in the force flow of the transmission 1, so that there is a preferred basic degree of drive torque distribution between the two output shafts 7 and 8, which is available with low losses apart from the frictional losses occurring in the teeth of the third planetary gearset 24.

FIG. 6 to FIG. 10 shows a schematic representations of a number of variant embodiments of a drivetrain 28 of a motor vehicle, in which, for the longitudinal or transverse distribution of the drive torque in the drivetrain 28, one of the embodiments described earlier of the transmission device 1 is combined with various other devices, represented only pictographically, for distributing a drive torque in the longitudinal direction of a vehicle between two driven vehicle axles or in the transverse direction of the vehicle between two drive wheels of a vehicle axle. With the help of the device for distributing a drive torque in the drive train, it should be possible, especially in critical driving situations, to produce a suitable distribution of the drive torque so that propulsive traction is maintained at the driven axles or drive wheels of a vehicle or so that drive-stabilizing action can be taken, if necessary.

The drive trains 28, shown in FIG. 6 to FIG. 10, each have two driven vehicle axles 29, 30, in the present case the axle 29 being a front axle and the axle 30 being a rear axle of a vehicle.

Figure 6:
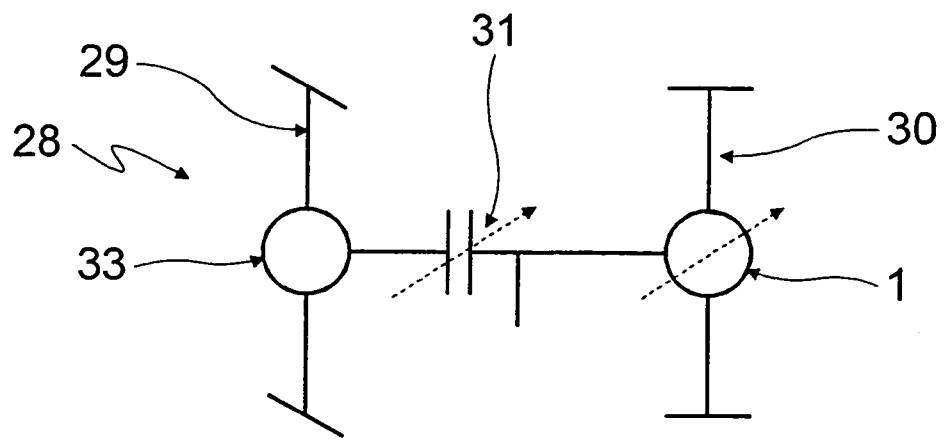
FIG. 6 is a schematic representation of a drive train of an all-wheel vehicle in which, for the longitudinal distribution of a drive torque between two driven vehicle axles a controlled clutch, and for the transverse distribution of the fraction of the drive torque supplied to a driven vehicle axle, a transmission device according to the invention are provided.

Referring to FIG. 6, the drive train 28 comprises for the longitudinal distribution of a drive torque between the two vehicle axles 29 and 30 a continuously adjustable clutch 31, for transverse distribution at the front axle 29 an open differential 32 of known type, and for transverse distribution at the rear axle 30 a transmission device 1 configured according to the invention or an overlap transmission.

Figure 7:
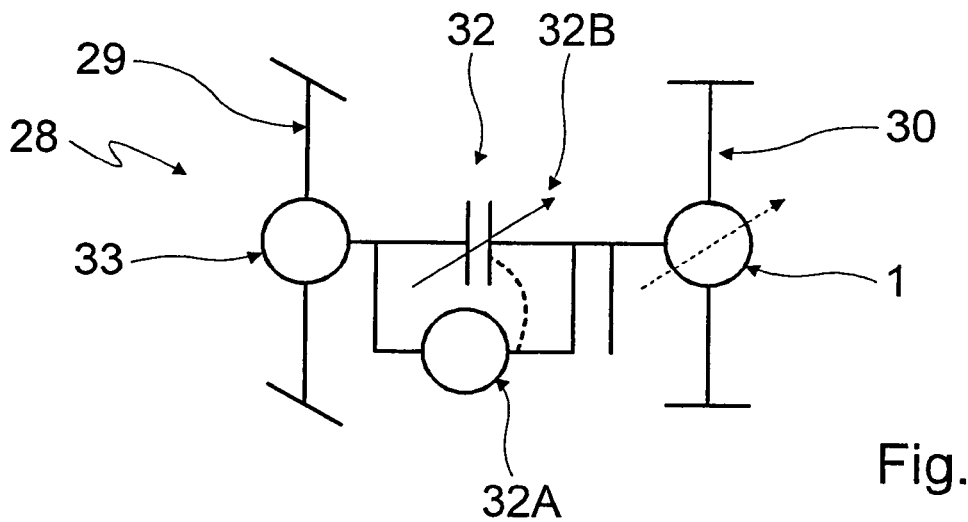
FIG. 7 is another example embodiment of a drive train, in which a transmission device according to the invention is provided for transverse distribution.

The drive train 28 in FIG. 7 differs from the example embodiment of the drive train 28 in FIG. 6 in that, for the longitudinal distribution of a drive torque between the front axle 29 and the rear axle 30, a device 32 is provided which, when there is a speed difference between the front axle 29 and the rear axle 30, builds up a hydraulic pressure by way of a pump system 32A with which frictional elements of a disk clutch 32B that can be brought into mutual frictional engagement can be acted upon in such a manner that a speed-difference-reducing torque can be applied to the two respective axles 29 and 30, while when the speeds are equal the pressure build-up is virtually zero.

Figure 8:
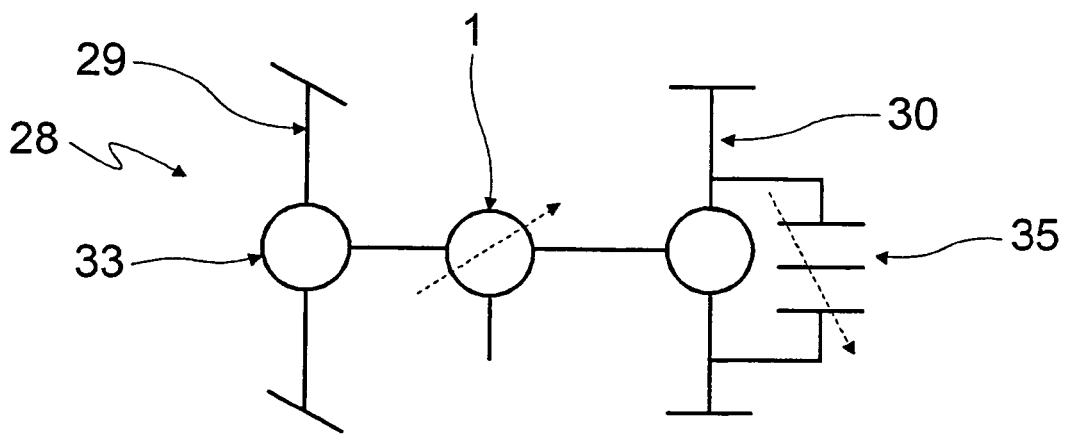
FIG. 8 is a third example embodiment of a drive train, in which a transmission device according to the invention is provided for the longitudinal distribution and a controlled differential lock for the transverse distribution of a drive torque.

In the drive train 28 of FIG. 8, the longitudinal distribution of the drive torque between the front axle 29 and the rear axle 30 is effected by a transmission 1, configured according to the invention, and the transverse distribution of the fraction of the drive torque supplied to the front axle 29 by an open differential 33. The transverse distribution of the fraction of the drive torque supplied to the rear axle 30 is effected by a controlled differential lock 35 of known type.

Figure 9:
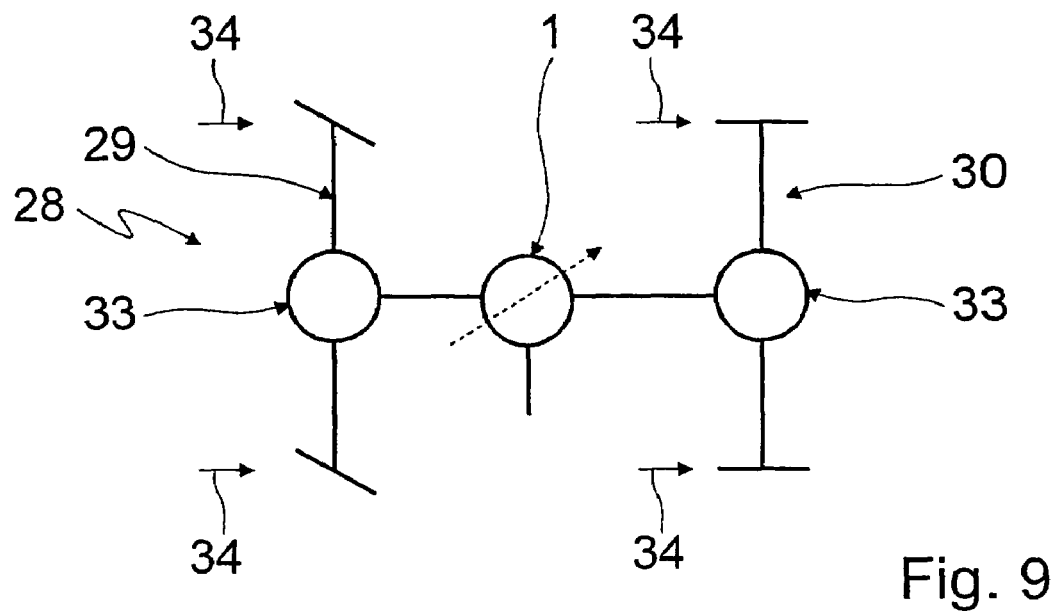
FIG. 9 is a fourth example embodiment of a drive train, in which longitudinal distribution of a drive torque is effected by a transmission device according to the invention and transverse distribution of a drive torque by an open differential.

Referring to FIG. 9, a drive train 28 is shown in which, for driving stabilization and free torque distribution between the front and rear axles 29, 30, an overlap transmission 1 is integrated, configured according to the invention, which is combined with brake engagement applicable on individual wheels. The brake engagement is symbolically represented graphically in FIG. 9 by the arrows indexed 34. For transverse distribution, open differentials are provided in the power trains of each of the vehicle axles 29 and 30.

Figure 10:
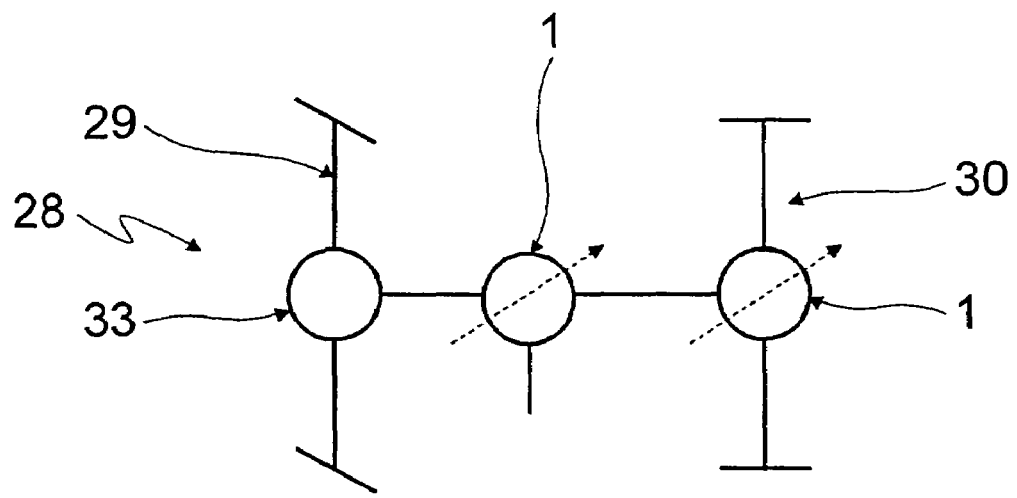
FIG. 10 is a fifth example embodiment of a drive train, in which both the longitudinal and the transverse distribution of a drive torque are effected by a transmission device according to the invention.

In the drive train 28, represented in FIG. 10, an overlap transmission, configured according to the invention, is arranged both in the longitudinal drive train and in the power train of the rear axle 30. This provides the advantageous possibility of continuously varying a degree of distribution of the drive torque between the two vehicle axles 29 and 30, as necessary, and depending on the operating situation and distributing the fraction of the drive torque delivered to the rear axle 30 between the two drive wheels of that axle, again as necessary, and depending on the operating situation. The fraction of the drive torque delivered to the front axle 29 is distributed by an open differential.

Clearly, it is open to the judgment of those with knowledge of the subject to configure the drive train of a vehicle in the longitudinal power train and in the power trains in the transverse direction of the vehicle of both vehicle axles with a transmission device according to the invention. This provides the advantageous possibility of adapting the drive torque between all the drive wheels of the drive train in accordance with the driving situation at the time.

REFERENCE NUMERALS 1 transmission device, transmission
2 first planetary gearset
3 second planetary gearset
4 first shaft of the first planetary gearset, annular gear wheel
5 first shaft of the second planetary gearset, annular gear wheel
6 drive input shaft
7 second shaft of the first planetary gearset, drive output shaft
8 second shaft of the second planetary gearset, drive output shaft
9 third shaft of the first planetary gearset
10 third shaft of the second planetary gearset
11 active connection
12 bevel gear
13 annular gear wheel of the first planetary gearset
14 annular gear wheel of the second planetary gearset
15 planetary gearwheels of the first planetary gearset
16 planetary gearwheels of the second planetary gearset
17 web of the first planetary gearset
18 web of the second planetary gearset
19 first brake
20 second brake
21 transmission housing
22 claw-type clutch
23 third planetary gearset
24 annular gear wheel of the third planetary gearset
25 solar gear of the third planetary gearset
26 A, B planetary gearwheels of the third planetary gearset
27 planetary carrier of the third planetary gearset
28 drive train
29 vehicle axle, front axle
30 vehicle axle, rear axle
31 controlled clutch
32 device
32A pump system
32B disk clutch
33 open differential
34 arrow
35 controlled differential lock
vt degree of distribution of the drive torque between the drive output shafts
gb_19 variation of the transfer capacity of the first brake
gb_20 variation of the transfer capacity of the second brake
W(u) lower limiting value of the transfer capacity of the brakes
W(o) upper limiting value of the transfer capacity of the brakes

The invention claimed is:

1. A transmission device (1) for distributing drive torque to at least two drive output shafts (7, 8), the transmission device (1) comprising:
   a first planetary gearset (2) having a first shaft (4) connected to a drive input shaft (6), a second shaft (7) being one of the at least two drive output shafts (7, 8) and a third shaft (9) which is in active communication with a first brake (19); and
   a second planetary gearset (3) having a fourth shaft (5) connected to the drive input shaft (8), a fifth shaft (8) being another of the at least two drive output shafts (7, 8) and a sixth shaft (10) which is in active communication with a second brake (20),
   the third shaft (9) communicates with the first brake (19) and the sixth shaft (10) communicating with the second brake (20) so that a degree of distribution of the drive torque, between the at least two drive output shafts (7, 8), varies as a function of transfer capacities of the first and the second brakes (19, 20) the second shaft (7) being solely driven by the first planetary gearset (2) and the fifth shaft (8) being solely driven by the second planetary gearset (3) without any sun gear or carrier of the first planetary gearset (2) being connected with any sun gear or carrier of the second planetary gearset (3).

2. The transmission device according to claim 1, wherein the first shaft (4) of the first planetary gearset (2) and the fourth shaft (5) of the second planetary gearset (3) are annular gears.

3. The transmission device according to claim 1, wherein the second shaft (7) of the first planetary gearset (2) and the fifth shaft (8) of the second planetary gearset (3) are planetary carriers.

4. The transmission device according to claim 1, wherein the third shaft (9) of the first planetary gearset (2) and the sixth shaft (10) of the second planetary gearset (3) are sun gears.

5. The transmission device according to claim 1, wherein an active connection (11) is provided between the third shaft (9) and the sixth shaft (10) which is engagable and which is made with a third planetary gearset (23).

6. The transmission device according to claim 5, wherein the third shaft (9) of the first planetary gearset (2) is connectable to a seventh shaft (24) of the third planetary gearset (23).

7. The transmission device according to claim 5, wherein the sixth shaft (10) of the second planetary gearset (3) is connectable to a eighth shaft (25) of the third planetary gearset (23).

8. The transmission device according to claim 5, wherein the active connection (11) between the third shaft (9) of the first planetary gearset (2) and the sixth shaft (10) of the second planetary gearset (3) is engagable by a clutch (22) arranged between one of the third shaft (9) of the first planetary gearset (2) and the seventh shaft (24) of the third planetary gearset (23) or the sixth shaft (10) of the second planetary gearset (3) and the eighth shaft (25) of the third planetary gearset (23).

9. The transmission device according to claim 5, wherein a second shaft (27) of the third planetary gearset (23) is fixed to a housing.

10. The transmission device according to claim 5, wherein the seventh shaft (24) of the third planetary gearset (23) is an annular gear.

11. The transmission device according to claim 5, wherein the second shaft (27) of the third planetary gearset (23) is a planetary carrier.

12. The transmission device according to claim 5, wherein the eighth shaft (25) of the third planetary gearset (23) is a sun gear.

13. A method for controlling and regulating a transmission device (1) having a first planetary gearset (2) being driven solely by a single drive input shaft (6), the first planetary gearset (2) having a first shaft (4) connected to the drive input shaft (6), a second shaft (7) being one of at least two drive output shafts (7, 8) and a third shaft (9) which is in active communication with a first brake (19); and
   a second planetary gearset (3) being driven solely by the single drive input shaft (6), the second planetary gearset (3) having a fourth shaft (5) connected to the drive input shaft (6), a fifth shaft (8) being another of the at least two drive output shafts (7, 8) and a sixth shaft (10) which is in active communication with a second brake (20), the third shaft (9) communicates with the first brake (19) and the sixth shaft (10) communicates with the second brake (20) such that a degree of distribution of the drive torque between the at least two drive output shafts (7, 8) varies as a function of transfer capacities of the first and the second brakes (19, 20), and the first planetary gearset (2) and the second planetary gearset (3) communicating only via an engagement between the first shaft (4) and the fourth shaft (5), the method comprising the steps of:

adjusting the transfer capacities of the first and the second brakes (19, 20) such that one of the first and the second brakes (19, 20) is engaged, to distribute a drive torque of a power source between the two output shafts (7, 8) of the transmission device (1); and varying the transfer capacity of another of the first and the second brakes (20 or 19) between a lower limiting value (W(u)) and an upper limiting value (W(o)), which corresponds to an engaged condition of the first and second brakes(19, 20).

14. The method according to claim 13, further comprising the steps of:

supporting essentially no torque by the first and the second brakes (19, 20) when the transfer capacity of the first and second brakes (19, 20) corresponds to the lower limiting value (W(u)); and fully supporting torque applied to one of the first and the second brakes (19 or 20) when the first and the second brakes (19, 20) are engaged.

15. The method according to claim 13, further comprising the steps of:

transferring essentially no drive torque to the output shaft (7 or 8) of a planetary gearset (2 or 3) associated with the brake (19 or 20) when the transfer capacity of a brake (19 or 20) corresponds to the lower limiting value (W(u)); and essentially completely transferring the drive torque from a power source applied to the transmission device (1) to the output shaft (8 or 7) of the other planetary gearset (3 or 2) associated with the brake (20 or 19) which is engaged at the same time.

16. The method according to claim 13, further comprising the step of varying the degree of distribution of the drive torque between the two output shafts (7, 8) as a function of the transfer capacity of the brake (19 or 20) whose transfer capacity is being changed 17. A drive train (28) of a vehicle with at least two driven vehicle axles (29, 30) and at least one transmission device (1) having a first planetary gearset (2) having a first shaft (4) connected to a drive input shaft (6), a second shaft (7) being one of at least two drive output shafts (7, 8) and a third shaft (9) which is in active communication with a first brake (19); and a second planetary gearset (3) having a fourth shaft (5) connected to the drive input shaft (6), a fifth shaft (8) being another of the at least two drive output shafts (7, 8) and a sixth shaft (10) which is in active communication with a second brake (20) and the drive input shaft (6) being the sole drive input for the transmission device (1), the third shaft (9) communicates with the first brake (19) and the sixth shaft (10) communicates with the second brake (20) such that a degree of distribution of the drive torque between the at least two drive output shafts (7, 8) varies as a function of transfer capacities of the first and the second brakes (19, 20), the transmission device (1) is arranged in a power path between a power source and the vehicle axles (29, 30) to distribute drive torque from the power source between the vehicle axles (29, 30), as necessary, and in a manner that depends on at least one operating situation, and in a power path of a vehicle axle (29 or 30) to distribute a fraction of the drive torque delivered to the vehicle axle (29 or 30) in a transverse direction of the vehicle between two drive wheels of the vehicle axle (29 or 30), as necessary, and in a manner that depends on the operating situation, and the second shaft (7) being solely driven by the first planetary gearset (2) and the fifth shaft (8) being solely driven by the second planetary gearset (3)without any sun gear or carrier of the first planetary gearset (2) being connected with any sun gear or carrier of the second planetary gearset (3).

18. The drive train according to claim 17, wherein the power path between the power source and the vehicle axles (29, 30) is provided with a controllable clutch (22) for distribution of the drive torque from the power source between the vehicle axles (29, 30), as necessary, and in a manner that depends upon the operating situation.

19. The drive train according to claim 17, wherein for distribution of the drive torque from the power source between the vehicle axles (29, 30), as necessary, and in a manner that depends upon the operating situation, the power path between the power source and the vehicle axles (29, 30) is provided with a device (32) which, when there is a speed difference between the vehicle axles (29, 30), builds up hydraulic pressure by a pump system (32A), with which frictional elements (32B) that can be brought into frictional engagement can be acted upon such that a speed-difference-reducing torque is applied to each of the two vehicle axles (29, 30).

20. The drive train according to claim 17, wherein for distribution of the fraction of the drive torque delivered to one of the vehicle axles (29 or 30) in the transverse direction of the vehicle between two drive wheels on the vehicle axle (29 or 30), as necessary, and in a manner which depends upon the driving situation, a controlled differential look (35)is arranged in the power path of the axle (29 or 30)

21. The drive train according to claim 17, wherein for distribution of the fraction of the drive torque delivered to one of the vehicle axles (29 or 30) in the transverse direction of the vehicle between two drive wheels on the vehicle axle (29 or 30), as necessary, and in a manner which depends upon the driving situation, the power path of the axle (29 or 30) incorporates an open differential (33).

* * * * *